O. E. KELLUM.
METHOD OF PRODUCING ASSEMBLED SYNCHRONOUS KINETOGRAPH AND PHONOGRAPH RECORDS.
APPLICATION FILED APR. 28, 1915.
1,294,672.
Patented Feb. 18, 1919.
2 SHEETS—SHEET 2.
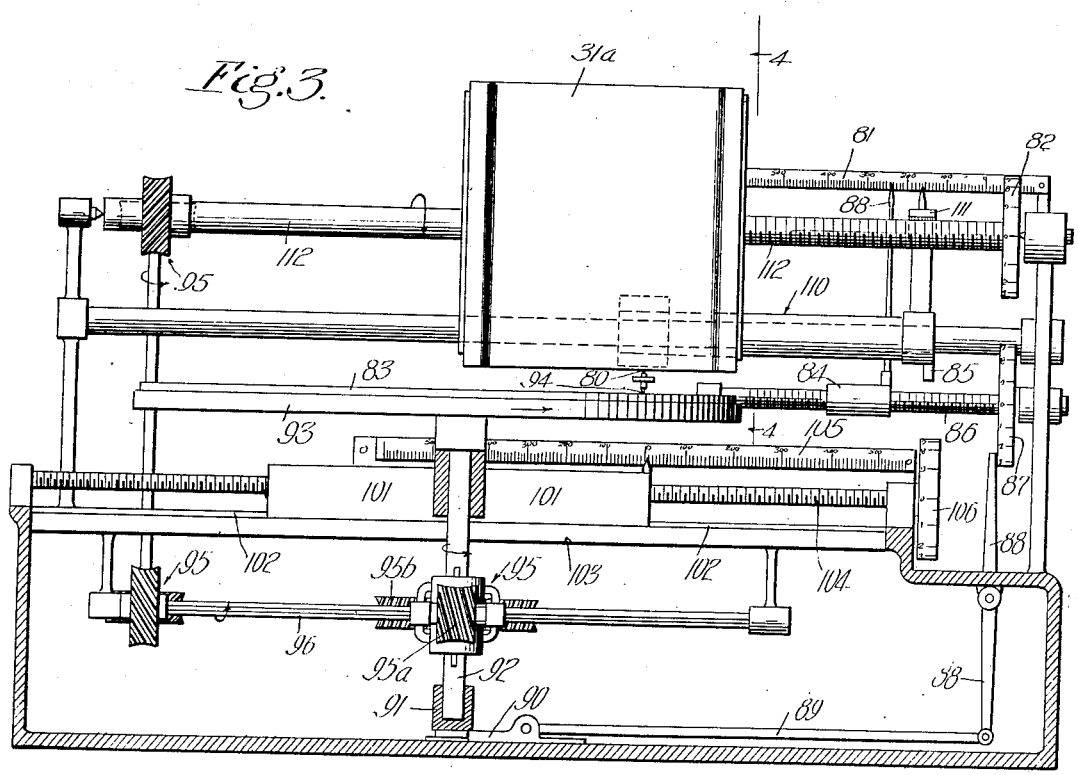

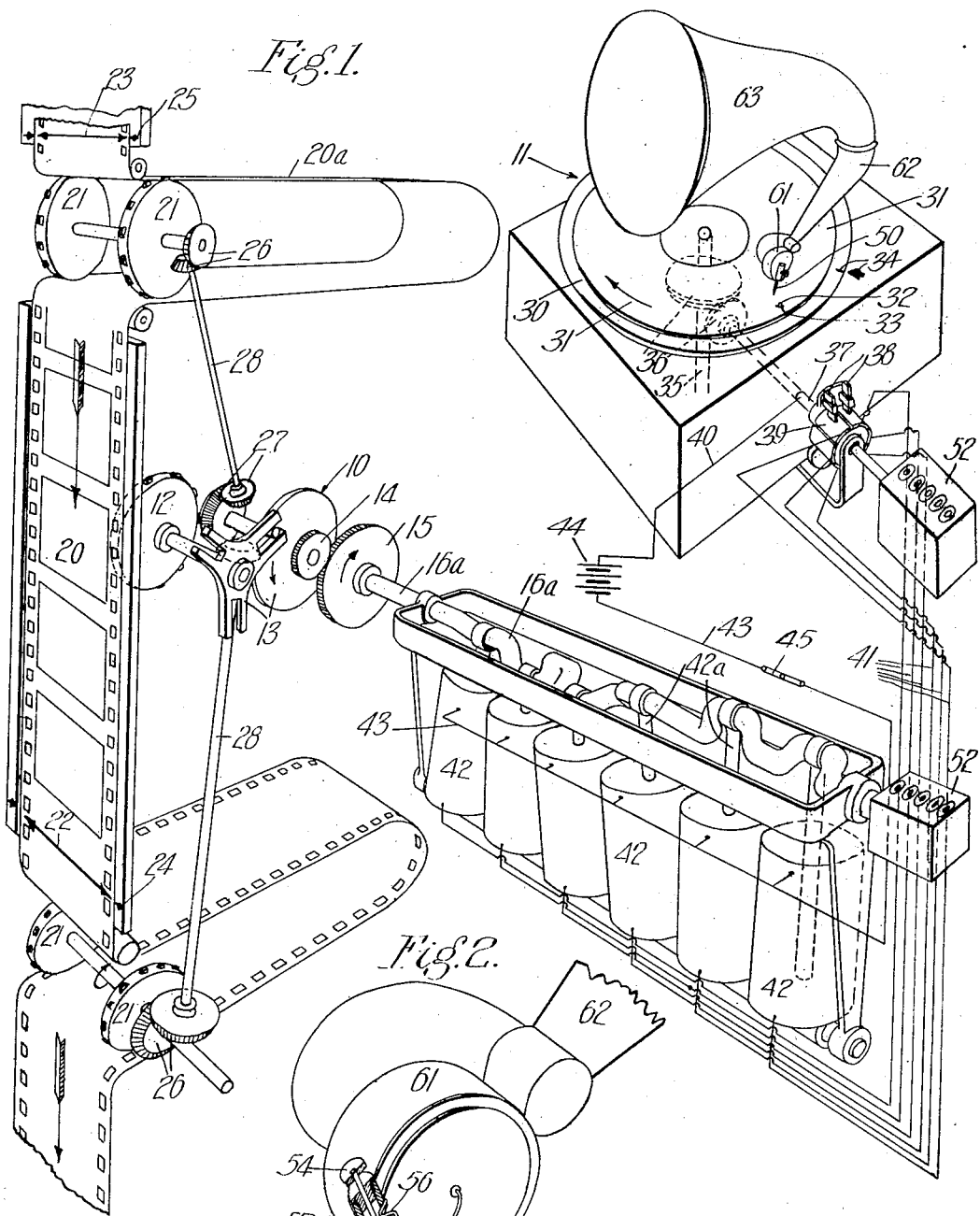

UNITED STATES PATENT OFFICE.

ORLANDO E. KELLUM, OF LOS ANGELES, CALIFORNIA.

METHOD OF PRODUCING ASSEMBLED SYNCHRONOUS KINETOGRAPH AND PHONOGRAPH RECORDS.

1,294,672. Specification of Letters Patent. Patented Feb. 18, 1919.

Continuation of application Serial No. 848,068, filed June 29, 1914. This application filed April 28, 1915. Serial No. 24,591.

*To all whom it may concern:*

Be it known that I, ORLANDO E. KELLUM, a citizen of the United States, residing at Los Angeles, in the county of Los Angeles, State of California, have invented new and useful Improvements in Methods of Producing Assembled Synchronous Kinetograph and Phonograph Records, of which the following is a specification.

This invention relates to the production of synchronous kinetograph and phonograph records by a method of assembly; and the invention herein described and claimed is in the nature of a continuation from my application S. N. 848,068, filed June 29th, 1914. In said application, and also herein, I explain a mechanism for synchronizing and for producing synchronous kinetograph and phonograph records; and the following has to do particularly with the method by which such production of synchronous records is effected.

It is a primary object of this invention to provide a method for producing synchronous records by a method of assembly, various phases of which are hereinafter described. There are two phases of my method to which I particularly call attention. It will be noted that in the body of this specification I explain generally a method by which distinct sets of synchronous kinetograph and phonograph records may be produced and parts measured and selected therefrom and assembled into one complete synchronous set in any sequence. The two phases of my method which I particularly emphasize have to do with the production of the original separate sets of synchronous records. I may say that the production of such sets is either a matter of design or accident. As an illustration of production by design I may cite the production of a number of sets of synchronous records of different scenes of a play, which sets are afterward selected from and assembled into a whole synchronous set. As an illustration of production by accident I may cite the case where a kinetograph film breaks or where the action is faulty or where for any other reason it becomes necessary or desirable to cut out a portion of the records; and in such case, where two portions of the records are separated by any break in continuity of record or of action, the parts of the records before and after the break may be regarded as two separate and independent sets of synchronous records to be afterward assembled according to my method.

The details of the method and of my preferred mechanism for its practice are explained in preferred form in the following specification, the mechanism being shown in preferred form in the accompanying drawings, in which, Figure 1 is a perspective view illustrating my invention, Fig. 2 is a perspective illustrating a portion of the phonograph machine, Fig. 3 is an elevation illustrating a dubbing machine equipped with special apparatus for practising my method and Fig. 4 is a detail section taken as indicated by line 4—4 on Fig. 3.

In the drawings the numeral 10 may designate a kinetograph machine of any character and the numeral 11 may designate a phonograph machine of any character. These machines may either be taking or reproducing machines or machines of any similar character. I have shown the kinetograph machine having film moving sprockets 12 operated by Geneva movement 13 which may itself be operated through gears 14 and 15 from the motor 16, or from any other source or means as hereinafter described. The motor 16 is of the general character which I have described in my Patent No. 1,027,658 issued May 28th, 1912, or in my application S. N. 836,910, filed May 7th, 1914. The sprocket 12 drives the film 20 which travels in the direction indicated; and above and below the sprocket 12 the film passes over the upper and lower sprockets 21, loops 20ª being formed in the film to provide a certain amount of looseness between the intermittently driving sprockets 12 and the constantly driving sprockets 21. For the purposes of my invention, I provide the film 20 with a pair of marks or designations 22 and 23 thereon and these two marks are to be placed opposite corresponding marks 24 and 25 on the stationary parts of the machine when the film is adjusted to the machine. In Fig. 1, the film is shown in its starting position. There is a definite length of film between the two marks 22 and 23, this definite length being conveniently measured by a certain number of sprocket holes in the film. If the film breaks at the sprockets 12 it does not disengage from the upper sprockets 21, and the film can always be properly engaged by sprockets 12 by merely making the loop 20ª of the proper length, the number of sprocket holes which must be between the marks 24 and the marks 25 being known. The sprockets 21 are driven in synchronism with the film driving sprockets 12 but are driven constantly. Any driving means may be used for sprockets 21, such as beveled gears 26 and 27 and a shaft 28, the ratios of the gears being such that sprockets 21 are driven at the correct speed.

The phonograph machine 11 may be of any desired character. In the form shown, I have shown a record table 30 carrying a disk record 31 which may be registered in proper position on the table by a pin 32 passing through an aperture 33 in the record. The table may be registered on the box or base of the machine by suitable marks 34. The table may be propelled in any suitable manner common to the art. Preferably geared directly from shaft 35, through gears 36, I provide a commutator shaft 37 which carries commutator brushes 38. These brushes revolve about a stationary commutator 39 having, in this case, six segments. A common wire 40 may connect with the brushes 38 through the shaft 37 while six independent wires 41 connect with the commutator segments. The six wires 41 run respectively to the six magnets 42 of the motor 61, these wires running to one side of the magnets while there is a common wire 43 conected to the other side of each of the magnets. The common wires 40 and 43 connect to opposite sides of the battery 44, wire 43 having a suitable switch 45 therein.

The operations of the motor 16 and the electrical parts of the apparatus are substantially as described in said patent and in said application; with the exception that in the present case I have shown the magnets as oscillatingly mounted at their lower ends so that no pivoted connecting rods are needed between the armatures and crank shaft. The operation of the commutator and brushes 38 and 39 sends successive electrical impulses to the several magnets 42 which attract their armatures 42ª in succession. These armatures are connected directly to the crank shaft 16ª of the motor and this crank shaft may be connected directly to the gear 15. The phonograph and kinetograph are consequently always synchronously operated; the kinetograph film is always in a definite position relative to the position of the phonograph record 31, or relative to the position of the reproducer needle 50 on the phonograph record. I connect to the phonograph machine a suitable revolution counter 51 and connect a similar counter 52 to the kinetograph machine. Preferably these counters are connected directly to the shafts 37 and 16ª, as these shafts make equal numbers of revolution and consequently the indications of the counters will always correspond when the two machines are in proper synchronism.

If, for any reason, the two machines are moved out of synchronism, as is hereinafter pointed out, the counter indicator gives means of moving them back to synchronism. In so doing it is necessary at times, when reproducing records, to move the phonograph backward. For instance, if the kinetograph film breaks it is desirable to stop the kinetograph as quickly as possible; which may be done by opening switch 45. The phonograph may be stopped at any time thereafter and, after the kinetograph film is ready to again start, the phonograph may be moved back into synchronism with it.

In Fig. 2 I have shown a suitable means for allowing the phonograph machine to be backed up without the needle 50 losing its proper groove. Supposing that the needle is partly through the record and that it becomes necessary to stop the machine and to back the phonograph machine in order to place it in synchronism with the kinetograph. I have shown an ordinary form of sound box 61 mounted upon the sound arm 62 which connects with the horn or other equivalent member 63. The sound box 61 may be raised so as to raise the needle 50 off the record at any time; but, if the needle is raised off the record to back the record, the proper groove is lost and the phonograph cannot be set in synchronism with the kinetograph. I provide a small auxiliary needle 53 which points backwardly, in a direction opposite to that of needle 50 along the record and which may be pressed down by a thumb button 54 to enter the groove in which the needle 50 stands, the needle 53 being in proper relation to the needle 50 for this purpose. A small spring 55 may normally hold the needle 53 up off the record. A small spring catch 56 may be used to hold the needle 53 in either its lowermost or uppermost position. When it is desired to back the record 31, the button 34 is pressed down and the needle 53 enters the groove in which the needle 50 stands. While the button 54 is held down so as to hold the needle 53 in the groove the reproducer is raised by the finger until the catch 56 engages over the collar 57 on the needle. The needle 53 will then be held by the weight of the sound box in the proper groove and the record may be moved in the direction opposite to that indicated. When the record has been moved to proper position, the sound box is pushed down and the needle 53 raised, care being taken that the point of the needle 53 is not removed from the grove until the point of the needle 50 enters the groove again.

In the present embodiment of my invention, I arrange the machines so that the counters will give indications sufficiently accurate to set the machines in synchronism so close that no discrepancy can be detected. In this embodiment the commutator 39 is geared to revolve at almost twice the speed of the table 30. The counter indicates whole revolutions and such fractions that it will give an indication for about every half inch or less of peripheral travel of the sound record. The film is exposed at the rate of about sixteen exposures per second. I have found that a discrepancy amounting to as much as one half inch peripheral travel can be detected by one skilled in the art, while a discrepancy of an inch in travel is apparent to any one and spoils the production. The counters are sufficiently accurate to allow setting of the two records within these limits, and my synchronous motor drive is accurate far within these limits. I may use any form of counter or indicator which will accomplish results of the desired accuracy.

Having now first described my mechanism, I proceed to the description of my method of production of assembled synchronous phonograph and kinetograph records. I first describe the method of use of the machines for producing different sets of synchronous records and then describe the method of assembly into one continuous set of synchronous records.

Suppose now that synchronous records are being made on any such machines as shown in Fig. 1. The film and record blank are registered as hereinbefore stated and the machine started. If, during the action, any accident, either in the mechanism or in the action being recorded, causes a part of film and record to be spoiled, the action may be repeated and recorded again. The spoiled portions of the record may be easily eliminated when the records are copied, as is hereinafter described, the good portions being assembled into one continuous set of records. The different scenes and parts of plays may be taken separately on separate sets of synchronous records; and the plurality of sets of records thus produced may be afterward assembled into one whole continuous set of synchronous records in any desired sequence as hereinafter described. There are many other methods of procedure in which separate sets of synchronous records may be produced; and such methods may suggest themeselves to those skilled in the art. In whatever manner the original sets are produced, they are assembled as now described. For instance, say that we have two original sets approximately each one thousand units long (counter units); that on the first set we throw out all the record up to the counter indication, say one hundred one, and all after the counter indication, two hundred sixty-five and four tenths. These numbers are noted for both records of the set. The second set may be used in entirety, say. The operation of assembling the films to form a continuous negative is simply one of cutting the first film at the numbers noted and piecing on the second film at its end, the second film then beginning at the ending point of the first, which point is designated by counter number two hundred sixty five and four tenths. When the first phonograph record is dubbed, the dubbing machine begins to operate on the first original record at a starting point indicated by counter indication one hundred one and when the indication two hundred sixty five and four tenths is reached the machine is stopped, the original record is taken off and the second original record put on; and the dubbing of the second original record then begins at said point indicated by counter indication two hundred sixty five and four tenths. Thus the second kinetograph and phonograph selections begin at the same point in the final assembled records and synchronism is assured.

The operations described in the immediately foregoing involve the proper selection of the parts of records to be retained and also the taking out of such selected parts. In selecting the desired parts the record is run through a machine having a standard counter; for instance, the sound record is run through such a phonograph as is shown in Fig. 1. Having ascertained approximately where the desired parts of the record lie, the record may be moved back and forth until the proper point is reached. The reading of the counter is then taken. Generally, the sound record is divided at points of sound stoppage, and an experienced person can locate by eye the point of cessation of sound on the record, once the general location of that point is determined. The location and designation of counter indication of exact points on the kinetograph film is similarly ascertained by running the film through such a machine as shown in Fig. 1 with a counter; but it will be noted that it is not necessary to run the sound and visual records simultaneously. The work of selecting and designating by numbers is usually done by the director of the production company. The selections made by him are noted and are handed over to an operator who assembles the selected portions of films and records. Assembly of films is done by cutting and splicing. Assembly of records is done on a suitable dubbing machine. In some cases the original sound record is made on a cylinder. This cylinder is placed on a dubbing machine, as at 31ª in Fig. 3. The operator moves the record following needle 80 to the beginning point, say the point one hundred one; there being a scale indicator 81 and a divided head 82 having designations corresponding to the counter indications on the original machines. The follower needle is carried in any usual manner on the carriage 110; which carriage has a part nut 111 engaging the threads of shaft 112 on which the record 31ª is mounted and carried. The dubbing machine is then started and record is cut on the blank 83, (master record), in the ordinary manner. The operator also notes the ending number two hundred sixty five and four tenths; and he sets the adjustable nut 84 so that when the designated point is reached by the follower needle the nut 84 will be engaged by the lug 85 and moved to the left in Fig. 3. The screw shaft 86 carries the nut and has a divided head 87, which head 87 in conjunction with the point 88 enables the nut to be set accurately in any desired position. The shaft 86 is longitudinally slidable; and is moved with the nut to the left when the lug 85 engages the nut. A lever 88 is moved with the head 87, and said movement causes, through rod 89, the withdrawal of a dog 90 from beneath a step bearing 91 in which shaft 92 of record table 93 is supported. When this action takes place the table and record immediately drop and the record 83 is moved out of operative engagement with the cutting needle 94. Driving connection 95 is provided between shaft 112 and table shaft 92; the arrangement being such that, by virtue of the gear 95ª sliding on horizontal shaft 96, and by virtue of gear 95ᵇ sliding on the table shaft 92, the table and the record 83 thereon may be moved horizontally (for the purpose hereinafter described) and also may move vertically when the dog 90 is withdrawn; all without changing the proper relation of the gears.

When the above described action has taken place and the table and record 83 have dropped, then the machine is stopped and the next record 31ª put on. Now the point at which it is desired to begin taking off the next record does not necessarily correspond to the point at which reproduction from the first record ceased. The final master record 83 is mounted on the table 93 on a base 101 slidable on ways 102 on base 103; and a screw 104 provides means for moving the record longitudinally to any point desired. An indicator 105 and divided head 106 provide means for accurately setting the final master record 83 so that, in any case, the beginning end of the new record 31ª is opposite the same point that point two hundred sixty five and four tenths was on the preceding record 31ª. The proper adjustment having been made, the dubbing machine is again started. By this method I provide for accurately assembling the parts of sound records in continuity on a master record in any sequence desired; and I make a final assembled master record which has just the parts desired from the original records, and no more; and I make a final master record in which perfect continuity is assured.

Having described a preferred form of my invention, I claim:

1. The herein described method of producing assembled synchronous kinetograph and phonograph records, comprising first the synchronous making of each of a plurality of individual sets of kinetograph records and phonograph records of the rotating type, ascertaining and selecting corresponding portions of said sets of records and forming said selected portions of records into one set of kinetograph and phonograph records by placing the selected portions of the kinetograph records in juxtaposition end to end, and by copying the selected portions from the several phonograph records onto a single phonograph record with said portions in consecutive arrangement on said last mentioned record.

2. The herein described method of producing assembled synchronous kinetograph and phonograph records, comprising first the synchronous making of each of a plurality of individual sets each comprising a kinetograph record and a phonograph record of the rotating type, and marking some corresponding point on each of the records of each set, ascertaining and selecting corresponding portions of the records of each set by measuring corresponding portions from said marked points, and then assembling said selected portions of records into a single set of continuous synchronous kinetograph and phonograph records by placing the selected kinetograph record portions in juxtaposition end to end and by copying the selected phonograph record portions of the original phonograph records onto another phonograph record of the rotating type with the copied selected portions in consecutive arrangement.

In witness that I claim the foregoing I have hereunto subscribed my name this 16th day of April, 1915.

Witnesses:

ORLANDO E. KELLUM.

JAMES T. BARKELEW,
ELWOOD H. BARKALEW.